United States Patent [19]
Bauer et al.

[11] Patent Number: 5,799,973
[45] Date of Patent: Sep. 1, 1998

[54] PYROTECHNIC GAS GENERATOR WITH TWO SEPARATE COMBUSTION CHAMBERS

[75] Inventors: Hermann Bauer, Stöttham; Richard Bender, Lauf; Franz Fürst, Mühldorf; Bernhard Vetter, Bruckmühl; Marc Winterhalder, Garching/Als; Siegfried Zeuner, München, all of Germany

[73] Assignee: TEMIC Bayern-Chemie Airbag GmbH, Aschau, Germany

[21] Appl. No.: 625,325

[22] Filed: Apr. 1, 1996

[30] Foreign Application Priority Data

Apr. 22, 1995 [DE] Germany .......... 195 14 896.7
Aug. 29, 1995 [DE] Germany .......... 195 31 667.3

[51] Int. Cl.[6] .................................. B06R 21/26
[52] U.S. Cl. ............................. 280/741; 280/736
[58] Field of Search ..................... 280/741, 742, 280/736

[56] References Cited

U.S. PATENT DOCUMENTS 5,033,390  7/1991  Minert et al. .................. 280/741
5,219,178  6/1993  Kobari et al. .................. 280/736
5,366,241  11/1994 Kithil ............................... 280/735
5,564,743  10/1996 Marchant ........................ 280/741

FOREIGN PATENT DOCUMENTS 0382552  8/1990  European Pat. Off. .
0404572  12/1990 European Pat. Off. .
0428298  5/1991  European Pat. Off. .
0449506  10/1991 European Pat. Off. .
3832120  3/1990  Germany .
4019877  1/1992  Germany .

*Primary Examiner*—Kenneth R. Rice
*Attorney, Agent, or Firm*—Paul J. Vincent

[57] ABSTRACT

The invention concerns a tubular gas generator for the filling of an airbag in a retention system for occupants of motor vehicles, whereby two separate combustion chamber units have a common connector and each combustion chamber unit has an ignitor unit with respective filters.

15 Claims, 2 Drawing Sheets

PYROTECHNIC GAS GENERATOR WITH TWO SEPARATE COMBUSTION CHAMBERS

BACKGROUND OF THE INVENTION

The invention concerns a pyrotechnic gas generator for filling an airbag in a retention system for occupants of a motor vehicle with two separate combustion chamber units.

A gas generator of this type is known in the art from U.S. Pat. No. 5,219,178. The gas generator described therein has, however, at least the disadvantage that both combustion chambers utilize a common filter so that an optimal adaptation of the filter to each of the different charges is not possible. The reason for this is the fact that the manner in which an airbag is inflated essentially depends not only on the chemical composition of the fuel utilized but rather also on the properties and arrangement of the filter. For this reason the filters must be specially adapted to each particular gas-generating mixture.

It is therefore the purpose of the invention to present a gas generator which avoids the above mentioned disadvantages.

SUMMARY OF THE INVENTION

This purpose is achieved in that two separate combustion chamber units have a common connector and each combustion chamber unit has an ignitor unit with associated filters.

In accordance with further advantageous improvements of the gas generator in accordance with the invention, each combustion unit has its own combustion chamber with solid fuel tablets arranged therein and having a prefilter and is radially surrounded by a fine filter which is particularly adapted to the respective combustion unit. In order to reduce production costs both combustion chamber units are preassembled and are inserted during final installation into either a common or each into a separate tubular filter housing having exhaust openings. The common or both separate tubular filter housing or housings is or are then flanged at one end.

The invention has, in particular, the advantage that, in addition to the optimum adaptation of each filter chamber to the respective charge, each combustion chamber can be ignited at a different time so that, after activation, a stepwise adaptation of the power output to the severity of the accident can be carried out and an airbag connected to the gas generator can be inflated more quickly or more slowly, firmly or less firmly. In addition, an ignition of both charges at separate times allows for a prolongation of the time during which the airbag remains inflated.

Two embodiments of the invention are thoroughly described below and are shown in the figures:

DESCRIPTION OF THE PREFERRED EMBODIMENT

Figure 1:
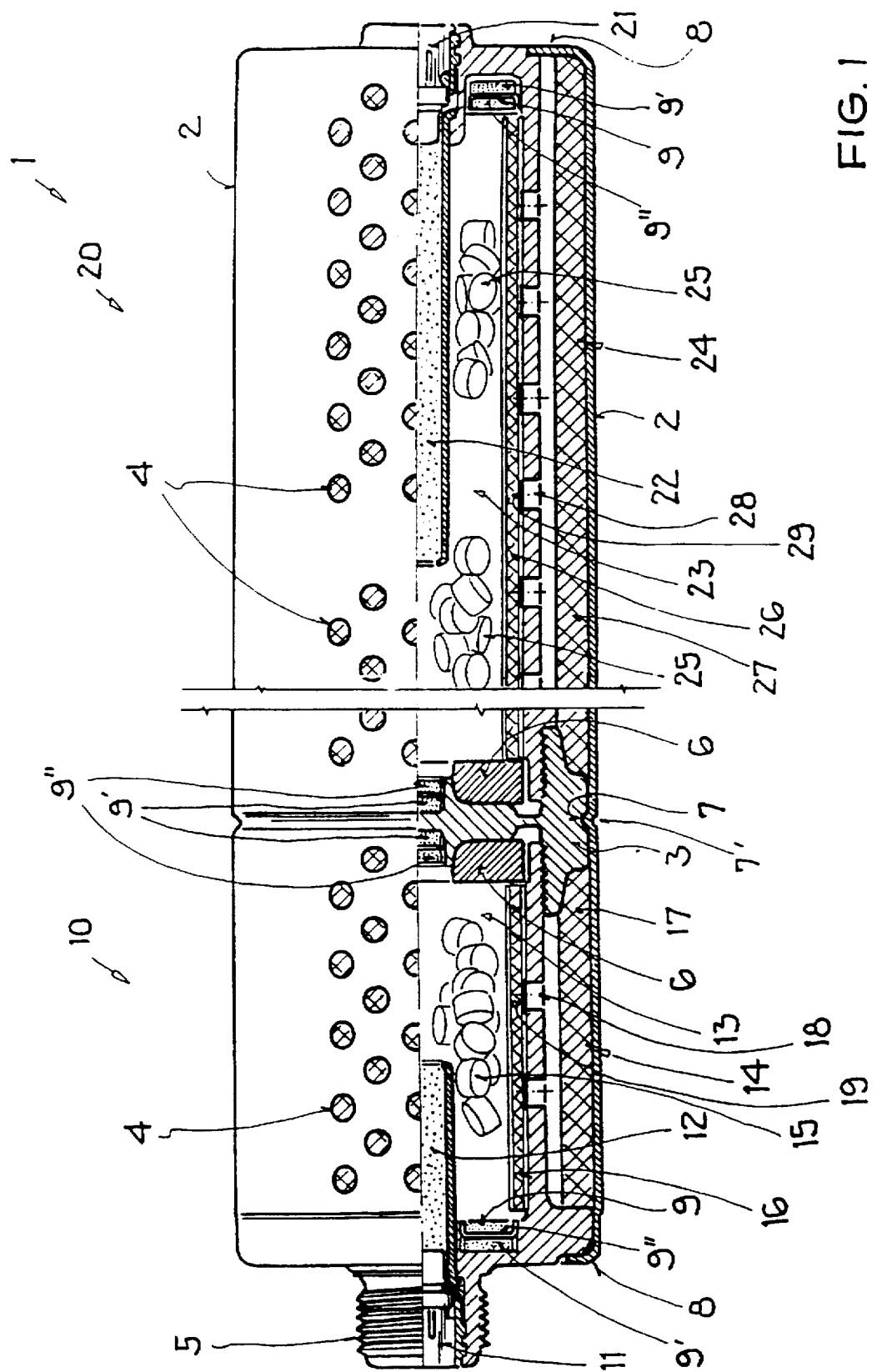
FIG. 1 shows a first embodiment of the gas generator in accordance with the invention with a common filter housing for both combustion chamber units.

In accordance with FIG. 1, a tubular gas generator 1 comprises a first combustion chamber unit 10 and a second combustion chamber unit 20. The first combustion chamber unit 10 comprises an electrical ignitor 11, an amplification charge 12, a combustion chamber 13 with solid fuel tablets 15, a prefilter 16, and flow openings 18 with a filter chamber 14 having a fine filter 17.

The second combustion chamber unit 20 contains an electrical ignitor 21, an amplification charge 22, a combustion chamber 23 having solid fuel tablets 25, a prefilter 26, and flow openings 28 as well as a filter chamber 24 having a fine filter 27. The combustion chamber units 10 and 20 have a common connector 3 and are kept together by means of a common filter housing 2 having exhaust openings 4 and comprising a mounting bolt 5. In the event that fuel tablets 15 or 25 are moisture-sensitive, it is necessary for the flow openings 18 or 28 or the exhaust openings 4 to be sealed by means of a sealing foil 19 or 29, for example an aluminum foil, in order to prevent the fuel from absorbing moisture. A fill body 6 is introduced between the fuel tablets 15 or 25 and the connector 3 to provide for volume compensation, and can for example, be in the form of a woven mesh.

In order to prevent a fragmentation of the filter housing 2 in the event of a fire during storage of the gas generator 1 or in the event of a fire within a motor vehicle having an installed gas generator 1, it is necessary for the fuel tablets 15 or 25 to burn before the filter housing 22 loses its mechanical integrity in consequence of the high temperature. Towards this end each combustion chamber unit 10 or 20 has an early ignition container 9 having early ignition pellets 9' and each having a cover 9". The early ignition pellets 9' are arranged in close proximity to the metal filter housing 2 or to the metal connector 3 where good heat transport is present in order that they, in the event of a fire, reach their ignition temperature as quickly as possible to ignite the fuel tablets 15 or 25 whose own ignition temperature is substantially higher.

The ignitor 11 or 21, the amplification charges 12 or 22 and the fuel tablets 15 or 25 can have the same or different properties depending on the amount of gas flow which is to be produced from each combustion chamber 13 or 23 in the event of activation. The fine filter 17 or 27 which is adapted to the respective combustion chamber unit 10 or 20 determines the time in which the produced gas volume is exhausted into a connected airbag.

It is advantageous when each combustion chamber unit 10 or 20 has its own particular prefilter 16 or 26 and fine filter 17 or 27 optimally tuned to the fuel 15 or 25.

Economical manufacture of the tubular gas generator 1 in accordance with the invention is realized by individually preassembling each combustion chamber unit 10 or 20 and introducing them into a common filter housing 2 separated by a common connector 3 during final installation.

The connector 3 has a rounded opening 7 on its outer side for attaching the connector 3 in the filter housing 2. After placement of the combustion chamber units 10 and 20 and the connector 3 in the filter housing 2, a bead 7' is produced, preferentially by rolling at an appropriate location, for fitting into the rounded opening 7 of the connector 3. This joining of bead 7' and opening 7 guarantees good heat conductivity between the filter housing 2 and the connector 3.

Finally, the open end of the tubular filter housing 2 is rolled-over so that a flange 8 is formed in each case with which the gas generator 1 inserts are held together.

Figure 2:
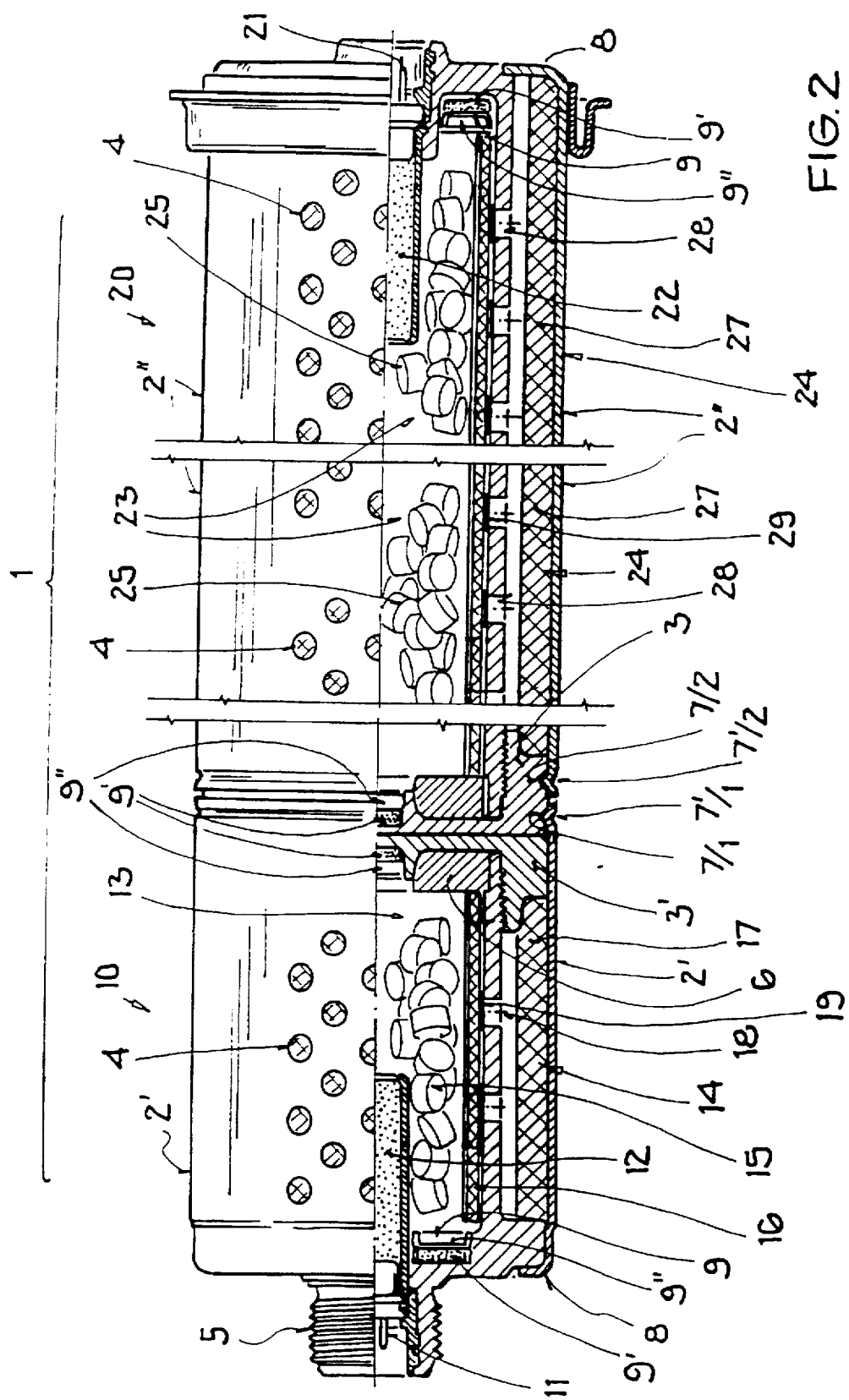
FIG. 2 shows a second embodiment of the gas generator in accordance with the invention with one separate filter housing for each combustion chamber unit.

FIG. 2 shows an additional gas generator 1 in accordance with the invention. In contrast to the embodiment shown in FIG. 1, a first and a second combustion chamber unit 10 and 20 are arranged in two separate filter housings 2' and 2" having exhaust openings 4. The two filter housings 2' and 2"

are held together with a common connector 3 with the connector 3 having two rounded openings 7'/1 and 7'/2 on its outer side. An end piece 3' serves as a cover for the combustion chamber unit 10. Alternative thereto connector 3 and end piece 3' could also be fashioned from a single piece.

Beads 7'/1 or 7'/2 are produced, preferentially through rolling, at appropriate locations, after insertion of the combustion chamber units 10 and 20 and the connector 3 into the corresponding filter housing 2' or 2" to fit into the respective rounded openings 7'/1 or 7'/2 of the connector 3. This joining of bead 7'/1 or 7'/2 and opening 7'/1 or 7'/2 additionally guarantees good heat conductivity between the filter housings 2' and 2" and the connector 3.

In this embodiment each combustion chamber unit 10 and 20 is also completely independently functionable since each has an ignitor 11 or 21 with amplification charge 12 or 21, a tubular combustion chamber 13 or 23 with fuel tablets 15 or 25, prefilters 16 or 26, and flow openings 18 or 28 as well as filter chamber 14 or 24 with fine filter 17 or 27. Each flow opening 18 or 28 or each exhaust opening 4 is sealed in an airtight fashion by means of sealing foil 19 or 29, for example an aluminum foil, to block the entrance of moisture.

In the embodiment shown, the gas generator 1 has a mounting bolt 5 on the outer end side of the filter housing 2' with which the gas generator 1 is attached to a vehicle structure. In order to prevent fragmentation in the event of a fire, the gas generator 1 has an early ignition container 9 with a cover 9" and containing ignition pellets 9' which are conventional and therefore need not be described in greater detail.

During final installation of the preassembled combustion chamber units 10 and 20 each open end of the tubular filter housing 2' and 2" is rolled-over so that a flange 8 is formed in each case with which the gas generator 1 inserts are held together.

We claim:

1. A gas generator for filling an airbag in a retention system for occupants of a motor vehicle, the gas generator comprising:
   a first combustion chamber unit having a first ignitor, a first filter means and a first tubular combustion chamber;
   a second combustion chamber unit having a second ignitor, a second filter means, and
   a second tubular combustion chamber, said first and said second combustion chamber units being axially arranged with respect to each other;
   at least one means for housing said first and said second combustion chamber units; and
   a means for connecting said first and said second combustion chamber units, said connecting means having at least one rounded opening at an outer periphery for forming a beaded connection with at least one housing means.

2. The gas generator of claim 1, wherein said at least one means for housing said first and said second combustion chamber units commonly houses said first and said second combustion chamber units.

3. The gas generator of claim 2, wherein said common housing means has a first flange at a first free end for interlocking connection to said first combustion chamber unit and a second flange at a second free end for interlocking connection to said second combustion chamber unit.

4. The gas generator of claim 2, wherein said first filter means has a first filter chamber having a first fine filter radially arranged around said first tubular combustion chamber and said second filter means has a second filter chamber radially arranged around said second tubular combustion chamber.

5. The gas generator of claim 1, wherein said at least one means for housing said first and said second combustion chamber unit comprises a first means for housing said first combustion chamber unit and a second means for housing said second combustion chamber unit.

6. The gas generator of claim 5, wherein said connecting means has a first rounded opening at an outer periphery for forming a first beaded connection with said first unit housing means and a second rounded opening at an outer periphery for forming a second beaded connection with said second unit housing means.

7. The gas generator of claim 5, wherein said first unit housing means has a flange at a free end thereof for interlocking connection to said first combustion chamber unit and said second unit housing means has a flange at a free end thereof for interlocking connection to said second combustion chamber unit.

8. The gas generator of claim 5, wherein said first filter means has a first filter chamber having a first fine filter radially arranged around said first tubular combustion chamber and said second filter means has a second filter chamber radially arranged around said second tubular combustion chamber.

9. The gas generator of claim 1, wherein said first filter means has a first filter chamber having a first fine filter radially arranged around said first tubular combustion chamber and said second filter means has a second filter chamber radially arranged around said second tubular combustion chamber.

10. The gas generator of claim 1, wherein said first ignitor is arranged at a first end of said first combustion chamber unit and said second ignitor is arranged at a second end of said second combustion chamber unit, said first end facing away from said second end.

11. The gas generator of claim 1, further comprising a first amplification charge axially adjacent to said first ignitor and a second amplification charge axially adjacent to said second ignitor.

12. The gas generator of claim 1, wherein said first and said second combustion chamber units each contain solid fuel tablets.

13. The gas generator of claim 1, wherein said first filter means comprise a first prefilter arranged in front of first flow openings and said second filter means comprises a second prefilter arranged in front of second flow openings.

14. The gas generator of claim 13, wherein said first flow openings are closed at an inside by a first sealing foil and said second flow openings are closed at an inside by a second sealing foil.

15. The gas generator of claim 14, wherein the sealing foil comprises aluminum.

* * * * *